United States Patent [19]

Daniels

[11] 3,863,802

[45] Feb. 4, 1975

[54] CAP FEEDING HOPPER

[75] Inventor: Ben G. Daniels, Elmhurst, Ill.

[73] Assignee: Continental Can Company, Inc., New York, N.Y.

[22] Filed: May 11, 1973

[21] Appl. No.: 359,517

Related U.S. Application Data

[63] Continuation of Ser. No. 114,835, Feb. 12, 1971, abandoned.

[52] U.S. Cl..................... 221/68, 221/175, 221/212
[51] Int. Cl.............................................. B65h 3/16
[58] Field of Search ........... 221/212, 182, 176, 175, 221/68

[56] References Cited
UNITED STATES PATENTS

| | | | |
|---|---|---|---|
| 1,548,563 | 8/1925 | Spencer | 221/212 X |
| 2,863,588 | 12/1958 | Stover | 221/212 |
| 3,269,514 | 8/1966 | Daniels | 221/212 X |
| 3,448,894 | 6/1969 | Modrey | 221/212 X |

Primary Examiner—Robert B. Reeves
Assistant Examiner—Thomas E. Kocovsky
Attorney, Agent, or Firm—Diller, Brown, Ramik & Wight

[57] ABSTRACT

A supply hopper and associated apparatus for feeding closure caps, which hopper has a rotatably mounted cap lifting disc in the bottom thereof provided about its margin with a row of circumferentially spaced, cap holding magnets which advance the caps in a single plane and in multiple line or multiple row arrangement, for discharge from the hopper at two discharge areas, which are disposed above the lowermost portion of the path of the caps, into two inclined cap chutes having their cap receiving top ends disposed adjacent the cap discharge areas of the hopper and spaced downstream of each other. There is a means at the first discharge area for wiping into the receiving end of the first cap chute the outermost line of caps which is held on the disc by the row of said magnets and a means at the second discharge area for wiping into the receiving end of the second cap chute the caps in the one or more lines thereof which will have formed on the margin of the lifting disc when the initially formed, outermost line is wiped off at the first discharge area. The cap chutes each include an orienting device for turning upside down caps into a right side up position and the chutes discharge into a common accumulating area or feed line.

17 Claims, 5 Drawing Figures

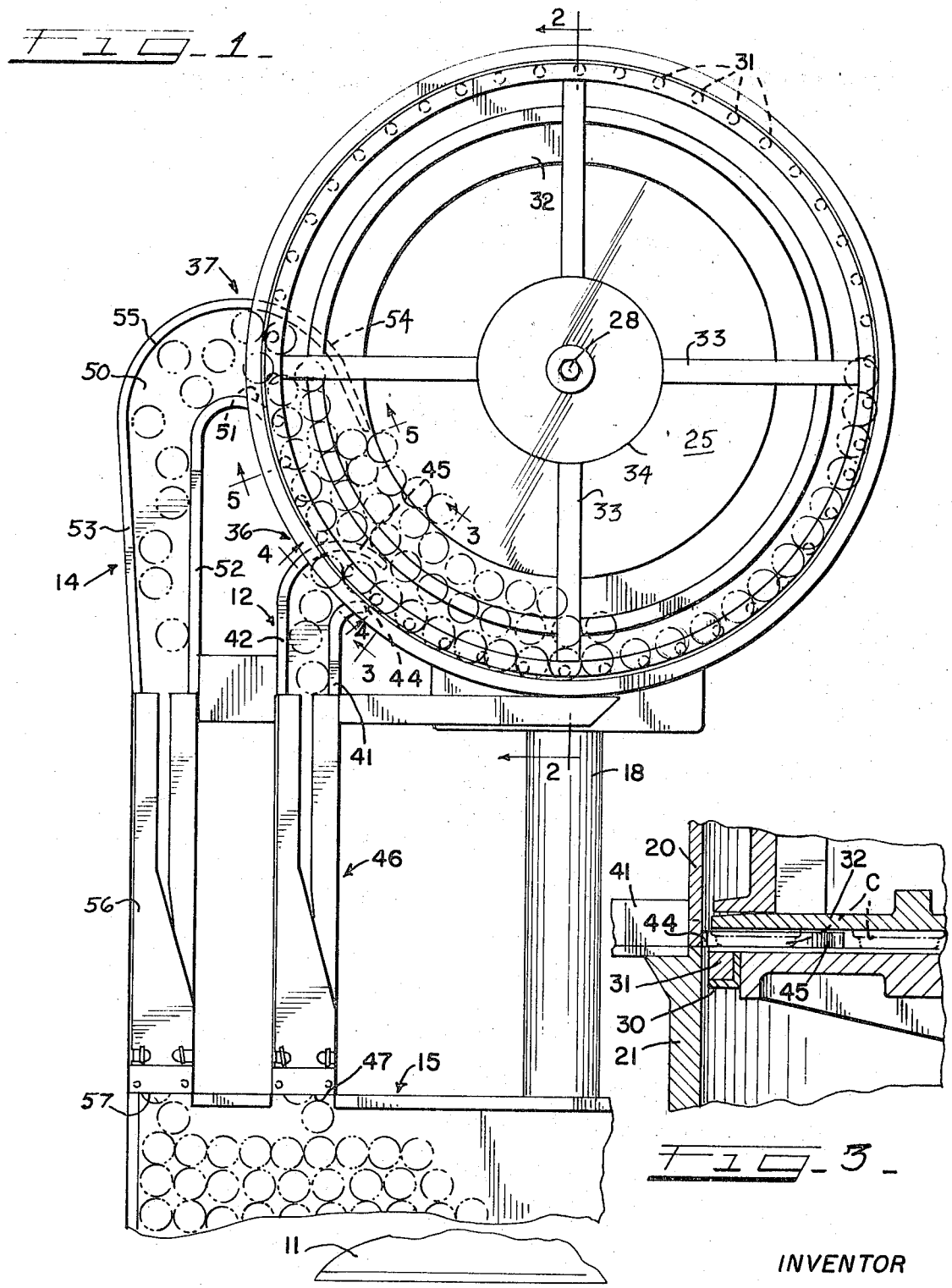

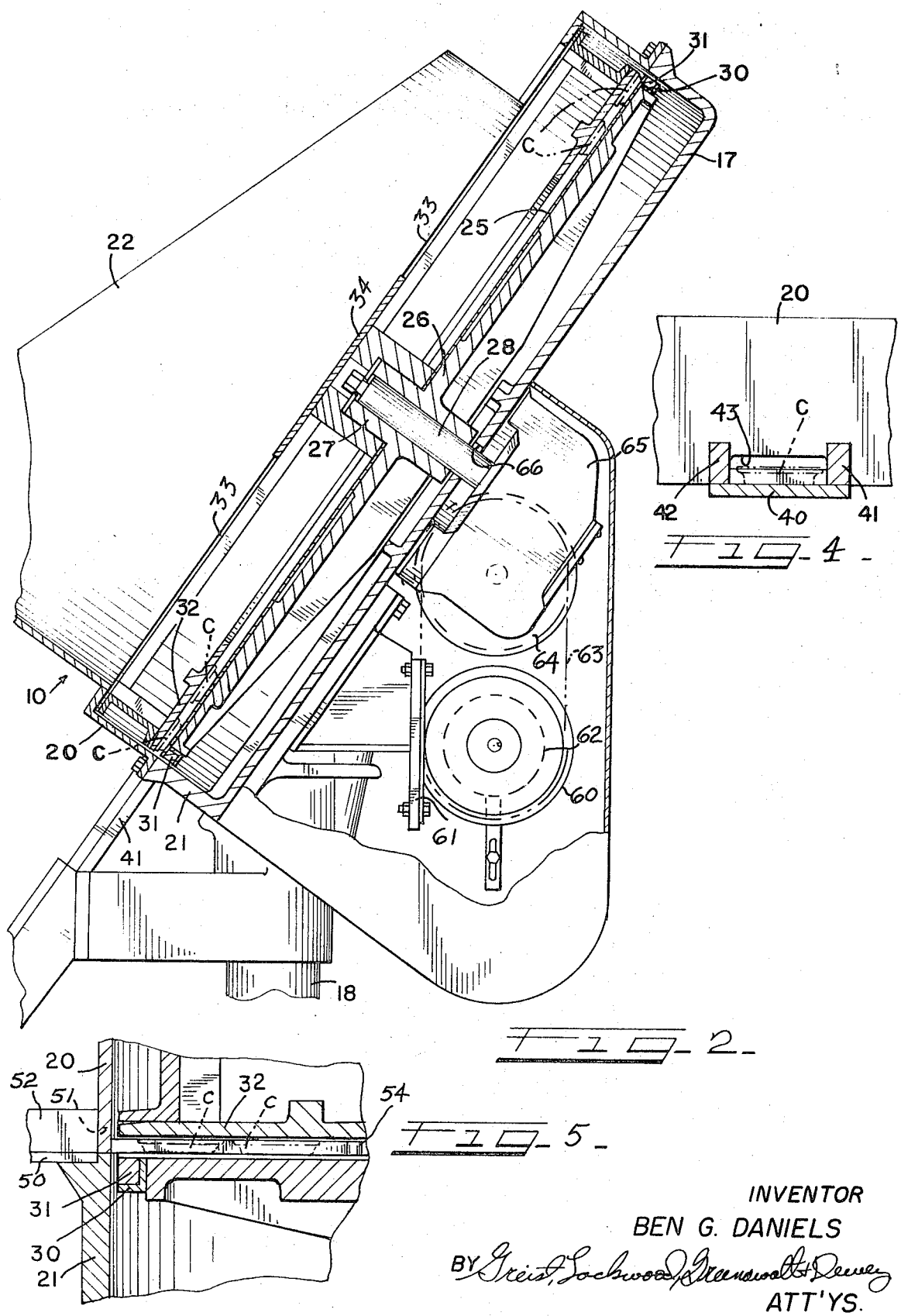

CAP FEEDING HOPPER

This is a continuation of Ser. No. 114,835, filed Feb. 12, 1971 now abandoned.

This invention relates to article handling and is more particularly concerned with improvements in a method and apparatus for feeding and positioning closure caps of the kind which are utilized for the closing and sealing of packing vessels such as jars, bottles and the like.

Apparatus has heretofore been developed for feeding, arranging and positioning closure caps for jars, bottles and similar packing vessels which has included a hopper into which the caps are dumped in miscellaneous array and associated mechanism for arranging the caps in a line and delivering the same to a cap chute having an associated mechanism for automatically inverting those caps which are delivered in upside down position so as to advance the caps through a guideway or chute leading to a sealing machine or the like in order that successive caps are presented in predetermined arrangement for application to the jars or other vessels to be capped. Generally, provision is made for delivery of the caps to the sealing or capping machines at a rate determined by the capping machine which means that the apparatus for supplying the caps must be capable of performance rates corresponding to or exceeding performance rates of the capping machine. One such apparatus is disclosed in U.S. Pat. No. 3,269,514, granted Aug. 30, 1966, wherein the caps are lifted in a single line on a rotatable disc mounted in the bottom of a hopper with the caps held by magnets in a single row at the edge of the disc and advanced to an upper discharge area where they are delivered to the top end of a chute which carries the caps to an orienting device and thence to a feed chute. While this apparatus has operated satisfactorily experience in the use of the same has indicated the desirability of increasing the performance rate of such apparatus so as to insure an adequate supply of caps for a high speed capping machine through the operation of a single cap feeding and orienting apparatus. Accordingly, it is a general object of the present invention to provide a hopper-type apparatus for feeding closure caps which is reliable in operation and which is capable of a higher performance rate than the apparatus heretofore provided.

It is a more specific object of the invention to provide an improved hopper and associated cap handling apparatus for delivering caps to a feed chute in a cap applying and sealing operation which is of simple construction, and economical to build, which requires little maintenance for reliable operation and which has a higher performance rate than heretofore considered possible for a single hopper unit.

It is another object of the invention to provide an improved cap feeding and orienting mechanism which comprises a hopper for receiving a supply of the caps in miscellaneous array and having means for delivering the caps to a pair of discharge chutes which have associated orienting devices for sensing the attitude of each cap and revolving upside down caps in proper arrangement for use, so that an adequate supply of the caps may be delivered to a feed line for maintaining a high speed capping machine at peak speed.

It is another object of the invention to provide in a cap feeding and orienting apparatus a hopper which receives a supply of the caps in random arrangement, with a disc mounted within the same for rotation in an inclined plane and having a plurality of magnets spaced about the periphery thereof and co-operating guide means for causing the caps to be arranged in a single plane on the disc and in the lowermost side of the hopper where an outer line or row of the caps will be formed due to magnetic attraction and others will arrange themselves loosely in adjoining rows for transport in a constant stream to the upper ends of a pair of inclined feed chutes, the one chute entrance being spaced downstream of the other chute entrance so that the outermost line of caps is divided to the first chute and the caps in adjoining lines move out on the margin of the disc and are carried to the second chute which has its entrance downstream of the entrance to the first chute.

It is a still further object of the invention to provide in a cap feeding and orienting apparatus a hopper for receiving a supply of the caps in random arrangement and having a bottom disc for rotation in an inclined plane with a plurality of magnets spaced about the periphery thereof in row arrangement and cooperating guide means causing the caps to be arranged in a single plane on the disc in the lowermost side of the hopper where an outer line or file is formed and held on the disc margin by the magnets while inner lines or files are loosely formed for delivery at successive discharge areas into the uppermost ends of inclined feed chutes which have means for orienting the caps which are in upside down position and for discharging the caps to an accumulating area, or the like, which may form part of a cap feeding line leading to a capping machine.

Another object of the invention is to provide a method of feeding closure caps from a source to a delivery point which comprises the steps of feeding the caps serially in the same direction along a first path, in multiple contiguous lines or files, diverting the caps in one of the lines to form a line flowing in a second path extending laterally of the first path, diverting the caps in a second line thereof to form a line flowing along a third path extending in the same general direction as the caps in the diverted first line, selectively orienting caps while flowing in the second and third paths so as to bring all the caps into uniform position and consolidating the flow of caps in the two lines at a collecting point or accumulating area so as to enable the caps to be further advanced in a single line for application to packing vessels.

These and other objects and advantages of the invention will be apparent from a consideration of the apparatus which is shown by way of illustration in the accompanying drawings wherein:

FIG. 1 is a front elevation of a closure cap hopper and associated cap feeding and orienting mechanism;

FIG. 2 is a view partly in section and partly in side elevation, to a larger scale, the sectional portions being taken on the line 2—2 of FIG. 1;

FIG. 3 is a fragmentary section taken on the line 3—of FIG. 1, to an enlarged scale;

FIG. 4 is a sectional view taken on the line 4—4 of FIG. 1, to an enlarged scale; and FIG. 5 is a sectional view taken on the line 5—5 of FIG. 1, to an enlarged scale.

Referring to the drawings, the apparatus which is illustrated comprises a hopper 10 into which the caps are dumped in miscellaneous array. The hopper 10 is supported on an upright pedestal 11 so that it is disposed in an outwardly inclined plane. A pair of straight line chute assemblies 12 and 14 are supported at a side of the hopper 10 for receiving lines of caps from discharge areas at the one side of the hopper. The chutes 12 and 14 and inclined downwardly and discharge the caps into an accumulating tray or area 15 from which they may be delivered directly to a capping machine or a storage receptacle or the like.

The hopper 10 which receives a supply of the caps in random position, or in miscellaneous array, comprises an upwardly opening, cylindrical, tray-like or bowl-shaped base 17 which is secured in fixed relation on the top of the upwardly extending post 18 at the upper end of the pedestal assembly 11. The hopper base 17 is supported on the pedestal 11 so that it is in a plane inclined upwardly in the neighborhood of 60° relative to the horizontal. A bowl rim extension-forming ring member 20 is secured on the top edge of the rim portion 21 of the bowl 17 and a funnel-like supply chute 22 is mounted thereon for feeding the caps into the hopper. The bowl rim extension 20 is secured by bolts or other suitable fastening means onto the top edge of the bowl rim 21.

A cap lifting disc 25 is mounted for rotation in the base 17 on a plate-like support 26 which has a hub 27 for mounting the same on a drive shaft 28, the latter extending normal to the plane of the base member or bowl 17. The disc support 26 is of somewhat smaller diameter than the circular disc 25 and carries on its outside periphery an outwardly opening ring 30 which is of angular cross section and which forms a cage for a plurality of relatively small magnets 31. The magnets 31 are spaced about the periphery of the support 26 in a line or circular row formation beneath the peripheral margin of the cap lifting disc 25. A circular guard plate 32 extends in spaced relation about the peripheral margin of the disc 25. The plate 32 is supported on four radial bracket arms 33 which extend radially from a hub 34. The hub 34 is bolted or otherwise secured on the disc hub 27 so that the plate 32 revolves with the disc 25. The plate 32 has its lower face disposed in parallel spaced relation with the top face of the disc 25, the spacing distance being slightly greater than the depth of the cap C so that the caps may slide beneath the innermost edge of the plate 32 and arrange themselves in a single plane, providing an outermost line which is held on the disc 25 by the magnets 31 and inner lines which are loosely formed by adjacent caps as the disc revolves about the shaft 28. The lines or flights of the caps are advanced in the direction of an upper portion of the path of the disc 25 until they reach discharge areas 36 and 37 where the bowl rim extension 20 is cut away or apertured to provide an exit opening for delivery of the caps C to the top entrance ends of the respective feed chutes 12 and 14.

The feed chutes 12 and 14 may be of identical construction except for the upper ends where the chute 14 is extended for connection to the hopper bowl 17 at the upper cap discharge area 37, the latter being beyond or downstream of the discharge area 36 where the chute 12 is connected. As shown in FIGS. 3 and 4, the chute 12 comprises at its upper end a floor forming bottom wall 40 and upwardly extending, generally parallel, spaced side walls 41 and 42. The floor 40 is disposed with its top surface approximately in the plane of the top surface of the cap lifting disc 25. The side wall 41 is curved at the end thereof into the opening 43 to join the hopper side wall 20 at 44 while the oppositely disposed end portion 45 of the side wall 42, which is downstream relative to the movement or flow pattern of the caps C, is reduced in height and extends through the wall opening 43 and across the margin of the disc above the row of magnets 31 and in the space between the face of disc 25 and the guard plate 32 so as to wipe off the outer row of caps which are held on the disc 25 by the magnets 31 and direct them into the chute assembly 12. A straight line cap orienting apparatus is indicated at 46 which is incorporated in the chute so as to turn caps which are upside down to a right side up position for discharge from the end 47 of the chute 12 into the accumulating tray 15. The chute 14 (FIGS. 1 and 5) has its upper end extended with the floor 50 terminating at the wall opening 51 and the upstanding side walls 52, 53 curving at the upper ends so that the side wall 52 meets the hopper side wall 20 and the end portion 54 of the side wall 53 is reduced in height and extends in the form of a finger through the opening 51 and across the marginal face of the disc 25, in the space between the disc 25 and the guard plate 32, thereby to wipe off the caps in the line which has moved out to the margin of the disc 25 and replaces the outermost line of caps initially formed by the magnets 31 which outermost line has been wiped off at 36 into chute 12. The finger portion 54 extends at the discharge area 37 a sufficient distance across the disc margin to wipe off several lines of the caps which may reach this point. The top portion 55 of the chute 14 is wide enough to accept several lines of caps and narrows to form the caps into a single line or file. The chute 14 has an orienting device indicated at 56 and discharges the caps, at the lower end 57, into the accumulating tray or area 15. The orienting devices 46 and 56 may be of any known construction, such as for example, the devices shown in U.S. Pat. No. 3,261,442 or my pending application Ser. No. 779,816, filed Nov. 29, 1968.

The hopper disc 25 is driven by motor 60 (FIG. 2) which is mounted on a bracket 61 with a suitable height adjusting mechanism on the top of the post 18. Motor 60 has an output shaft with pulley 62 which is connected by drive belt 63 with pulley 64 on the input shaft of gear box 65 from which the drive shaft 28 for the hopper extends through an aperture 66 in the hopper base 17.

In the operation of the apparatus caps are dumped in bulk into the chute 22 in random arrangement and as disc 25 rotates the lowermost caps settle onto the top surface of the disc 25 and form multiple lines or rows around the margin of the disc beneath the guard plate or ring 32. The lines or files of caps advance with the disc until they reach the discharge areas 36 and 37 where they are wiped off by the wiper arms or fingers 45 and 54 formed on the ends of the side walls of the chutes 12 and 14 and directed into the chutes 12 and 14. The initially formed, outermost line of caps is wiped off by the wiper finger 45 at the first discharge area 36. The caps in the inner lines are then free to move out by centrifugal force and new lines are formed with the outermost line held by the magnets 31 until the discharge area 37 is reached where the wiper finger 54 extends across the path of several lines to wipe off the caps therein and direct them into chute 14. The top end 55 of the chute 14 is narrowed in width so as to form a funnel-like entrance and the caps fall into a single line as they advance down the chute. The caps descend by gravity through the chutes 12 and 14 to the common accumulating area or tray 15, with the caps which are wrong side up being oriented or turned by the orienting device 46 and 56 so that all the caps are assembled in proper position for feeding to a capping machine, or the like, through a single line or in single file, thereby enabling a single hopper unit to double the output.

I claim:

1. An apparatus for handling closure caps which are of magnetic material, said apparatus comprising a cylindrical hopper, a cap lifting disc in said hopper which is mounted for rotation about an axis coinciding with the axis of the hopper and in a plane inclined to the horizontal, said disc having magnets mounted in row formation about the marginal edge thereof for holding on the uppermost face lines of caps so as to advance the caps to plural discharge areas, the first discharge area being located within 60° above the bottom of the path traversed by said row of magnets, an inclined cap receiving chute having an upper entry end disposed adjacent the periphery of said cap lifting disc at a first discharge area and means at said first discharge area to wipe off an outermost line of caps advancing on the cap lifting disc and to feed the caps into said chute and a second inclined cap receiving chute having an upper entry end disposed adjacent the periphery of said cap lifting disc at a discharge area spaced downstream of the upper end of said first cap receiving chute at a point less than 90° from said first discharge area, and means at said second discharge area to wipe off caps advancing on the marginal edge of the cap lifting disc and to feed the caps into said second cap receiving chute.

2. A supply hopper for feeding closure caps, said hopper having a rotatably mounted cap lifting disc inclined to the horizontal in the bottom thereof which is provided about its margin with cap holding means arranged in row formation so as to cause the caps to arrange themselves in a single plane and in multiple line formation on said disc, said hopper having successive discharge areas disposed between the lowermost portion of the path of the caps and the uppermost portion of said path in the direction of disc rotation, cap chutes having cap receiving ends adjacent the cap discharge areas of said hopper which are spaced relative to each other and in a downstream direction and wherein caps carried by said disc are carried through an arc of less than 180°, and means at the cap receiving end of each chute for discharging into the chute successive ascending caps in a line thereof which are held on the disc by said cap holding means.

3. A supply hopper for feeding closure caps as set out in claim 2 wherein said cap holding means comprises a plurality of magnets mounted in row formation at the marginal portion of said disc.

4. A supply hopper for feeding closure caps as set out in claim 2 wherein said hopper is provided with a guard ring member spaced above the top face of the marginal portion of said cap lifting disc whereby the caps are restricted to a single plane arrangement and to multiple lines on the margin of said disc.

5. A supply hopper for feeding closure caps as set out in claim 2 wherein the means at the cap receiving end of the first cap chute for discharging caps into the chute extends across the path of the outermost line of caps only and the means at the cap receiving end of the second cap chute for discharging caps into said chute extends across the path of a plurality of lines of caps.

6. A supply hopper for feeding closure caps as set forth in claim 5 and said second cap chute having a width at the receiving end for accomodating at least two lines of caps and narrowing to form the caps into a single line.

7. A supply hopper for feeding closure caps as set forth in claim 2 wherein the means for discharging the caps into each chute comprises an arm forming extension on a side wall of the chute which is disposed adjacent the top surface of said lifting disc and extends across the path of a line of caps carried on said disc.

8. A supply hopper for feeding closure caps as set forth in claim 2 wherein said cap lifting disc is mounted for rotation in a plane which is inclined relative to a horizontal plane and said cap holding means comprises a row of magnets mounted in marginal portions of said disc with the row of magnets spaced so as to cause the caps to form on the marginal face of the disc a plurality of concentric rows of closure caps.

9. A supply hopper for feeding closure caps as set forth in claim 2 wherein each of said cap chutes has an associated cap orienting device and said chutes are disposed in an inclined plane so that the caps advance through said chutes by gravity.

10. A method of feeding closure caps comprising the steps of providing a hopper having a rotatable cap lifting disc having magnetic means, rotating the cap lifting disc about an axis inclined to both the horizontal and vertical with the magnetic means being operable to move caps along a first path in a first uphill line within the hopper, diverting the upwardly moving caps from the first line to a second path, utilizing the rotating cap lifting disc and magnetic means to move other caps along an uphill continuation of the first line, diverting the other upwardly moving caps from the cap lifting disc into a third path, and consolidating the caps of the second and third paths at a collection area.

11. The method of claim 10 wherein the second and third paths flow downhill and the caps gravitationally flow therealong to the collection area.

12. The method of claim 10 wherein the diverting of caps from said first path into said second and third paths takes place generally within 90° of the beginning of said uphill line in the direction of cap movement.

13. A method of feeding closure caps from a hopper to a collecting area comprising the steps of rotating at least a portion of the hopper and feeding the caps serially in the same direction along an upwardly inclined rotational path generally within the hopper in at least two contiguous lines, diverting upwardly moving caps out of the hopper in a first one of the lines to form a line of caps flowing downwardly along a second path extending laterally of the first path, separately diverting other upwardly moving caps out of the hopper in a second line for the first path uphill of where the moving caps in the first one of said lines are diverted to form a line flowing downwardly along a third path extending in the same general direction as the caps in the diverted first line but spaced therefrom, and consolidating the flow of caps from the second and third paths at the collecting area.

14. A method of feeding closure caps as set forth in claim 3 and selectively orienting the caps while they are advancing along said second and third paths so as to bring all the caps into the same uniform position for application to packing vessels.

15. The method of claim 13 wherein the two lines of caps are radially adjacent and extend up hill in the direction of said rotation.

16. The method of claim 13 wherein the two lines of caps are radially adjacent and extend up hill in the direction of said rotation with the caps in the first one of the lines being initially lowermost and outermost.

17. The method of claim 13 wherein the two lines of caps are radially adjacent and extend up hill in the direction of said rotation, and the rotation of said hopper portion effects the forming of a rotating magnetic force path underlying only the first one of the lines of caps with said rotating magnetic force maintaining both of the lines of caps.

\* \* \* \* \*